(12) United States Patent
Wakabayashi

(10) Patent No.: US 6,785,018 B2
(45) Date of Patent: Aug. 31, 2004

(54) INTERNET FACSIMILE TERMINAL APPARATUS AND COMMUNICATION METHOD USING THE SAME

(75) Inventor: Takefumi Wakabayashi, Tokorozawa (JP)

(73) Assignee: Panasonic Communications Co. Ltd., Tokyo (JP)

( * ) Notice: Subject to any disclaimer, the term of this patent is extended or adjusted under 35 U.S.C. 154(b) by 585 days.

(21) Appl. No.: 09/749,672

(22) Filed: Dec. 28, 2000

(65) Prior Publication Data

US 2001/0055127 A1 Dec. 27, 2001

(30) Foreign Application Priority Data

Jun. 22, 2000 (JP) .................................... 2000-188366

(51) Int. Cl.[7] ........................... G06F 15/00; H04N 1/00; H04N 1/40
(52) U.S. Cl. ................ 358/1.15; 358/305; 358/1.17; 358/1.4; 358/440; 358/444; 709/200; 709/206; 709/207
(58) Field of Search ................. 358/305, 1.15, 358/1.17, 1.4, 440, 444; 709/200, 207, 206

(56) References Cited

U.S. PATENT DOCUMENTS 5,608,786 A * 3/1997 Gordon ..................... 370/352
5,805,298 A * 9/1998 Ho et al. .................... 358/402
5,881,233 A 3/1999 Toyoda et al.
6,061,502 A * 5/2000 Ho et al. ................... 358/1.15

FOREIGN PATENT DOCUMENTS

JP          8-242326      9/1996
JP          10-107837   * 4/1998

OTHER PUBLICATIONS

English Language Abstract of JP 8–242326.

* cited by examiner

Primary Examiner—Edward Coles
Assistant Examiner—Houshang Safaipour
(74) Attorney, Agent, or Firm—Greenblum & Bernstein, P.L.C.

(57) ABSTRACT

A POP access section accesses a POP3 server using a first user ID/password registered in a user ID registration table, fetches message information from a mailbox of the user ID, and stores it to RAM. A message information extracting section extracts necessary information from the message information, and stores it to be associated with the user ID. Thereafter, a reception list generating section reads message information of all user IDs from RAM, and generates a reception list. Sequentially, the reception list generating section outputs the generated reception list. A user, who has seen the reception list, instructs the POP access section to fetch an e-mail message from a panel control section. This improves communication concealment.

19 Claims, 13 Drawing Sheets

USER ID REGISTRATION TABLE

| PROGRAM KEY NUMBER | USER ID | PASSWORD |
|---|---|---|
| F1 | USR1 | 1234 |
| F2 | USR2 | 5678 |
| F3 | USR3 | 9012 |

FIG. 7

```
              1201
┌─────────────────────────────┐
│   *RECEPTION LIST*      │
│                             │
│  USR1    ONE E-MAIL MESSAGE │
│  USR2    TWO E-MAIL MESSAGES│
│  USR3    TEN E-MAIL MESSAGES│
│                             │
│                             │
└─────────────────────────────┘
```

FIG. 12

```
              1301
┌──────────────────────────────────┐
│    *RECEPTION LIST*          │
│                                  │
│  USR1      TWO E-MAIL MESSAGES   │
│  1.SENDER 1  1999/11/30   9:00   │
│  2.SENDER 2  1999/12/ 1  13:00   │
│                                  │
│  USR2      TWO E-MAIL MESSAGES   │
│  1.SENDER 3  1999/11/30   8:00   │
│  2.SENDER 4  1999/12/ 1  12:00   │
│                                  │
│  USR3      TEN E-MAIL MESSAGES   │
│  1.SENDER 5  1999/11/30  10:00   │
│                                  │
│  .........                       │
└──────────────────────────────────┘
```

FIG. 13

INTERNET FACSIMILE TERMINAL APPARATUS AND COMMUNICATION METHOD USING THE SAME

BACKGROUND OF THE INVENTION

1. Field of the Invention

The present invention relates to an Internet facsimile terminal apparatus and a communication method using the same.

2. Description of the Related Art

In recent years, e-mail type Internet facsimile terminal apparatuses (hereinafter referred to as IFAX terminal apparatuses), which perform data transmission/reception over the Internet using e-mail, have been in practical use as disclosed in, for example, Unexamined Japanese Patent Publication No. 8-242326 and the corresponding U.S. Pat. No. 5,881,233.

This IFAX terminal apparatus comprises a user interface, which has the same form as G3/G4 facsimile apparatus, which is generally used in an office or home. In other words, the IFAX terminal apparatus is contained in one housing, and is controllable by a panel having a 10-button keypad, one-touch button, and the like, and provides information to users on a relatively small LCD screen.

The IFAX terminal apparatus is shared by a plurality of users, and has a dedicated mail user ID (mail account) similar to the case in which G3/G4 facsimile has one FAX number. Then, a sender transmits e-mail to the dedicated mail user ID when transmitting e-mail to any user.

Similar to the case in which the G3/G4 facsimile prints all contents of received FAX data, the IFAX terminal apparatus prints all contents of received e-mail automatically, and the user can recognize the contents by the printed material.

As mentioned above, the conventional IFAX terminal apparatus receives all e-mails, which have been transmitted to the user, and prints them. There is a possibility that everybody will see them. In contrast, the normal mailer operates on the client that is used by one user or a specific user, who has a login right. In general, the normal mailer instructs the printer to execute printing to print out the content of an e-mail message after receiving an instruction from the user. Therefore, there is no possibility that the e-mail message will be printed regardless of the user's intention or against the user's intention. In this way, the IFAX terminal apparatus has concealment, which is much lower than the normal mail.

SUMMARY OF THE INVENTION

In consideration of the above-mentioned problem, the present invention has been made, and it is an object of the present invention to provide an Internet facsimile terminal apparatus, which is capable of improving concealment, and a communication method using the same.

Namely, in order to achieve the above object, in the present invention, message information is acquired from a mail server using mail user IDs and passwords of a plurality of users, which shares an Internet facsimile terminal apparatus. Then, acquired message information is outputted and an e-mail message directing to the corresponding user is received from the mail server in accordance with the user's instruction based on outputted message information, and the mail message is printed.

The reception and printing of the e-mail message are executed in accordance with the user's intention based on the outputted message information. This prevents occurrence of the problem wherein the e-mail message is received and printed without user's knowing, and is left on the output trays of the IFAX terminal apparatus, with the result that the content of the e-mail message is known to other users. Then, this makes it possible to improve concealment.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a view showing one example a user ID registration table of the Internet facsimile terminal apparatus according to the above embodiment;

FIG. 12 is a view showing an example of a reception list of the Internet facsimile terminal apparatus according to the above embodiment;

FIG. 13 is a view showing another example of the reception list of the Internet facsimile terminal apparatus according to the embodiment of the present invention.

DETAILED DESCRIPTION OF THE PREFERRED EMBODIMENTS

A preferred embodiment of the present invention will specifically explained with reference to the accompanying drawings.

Figure 1:
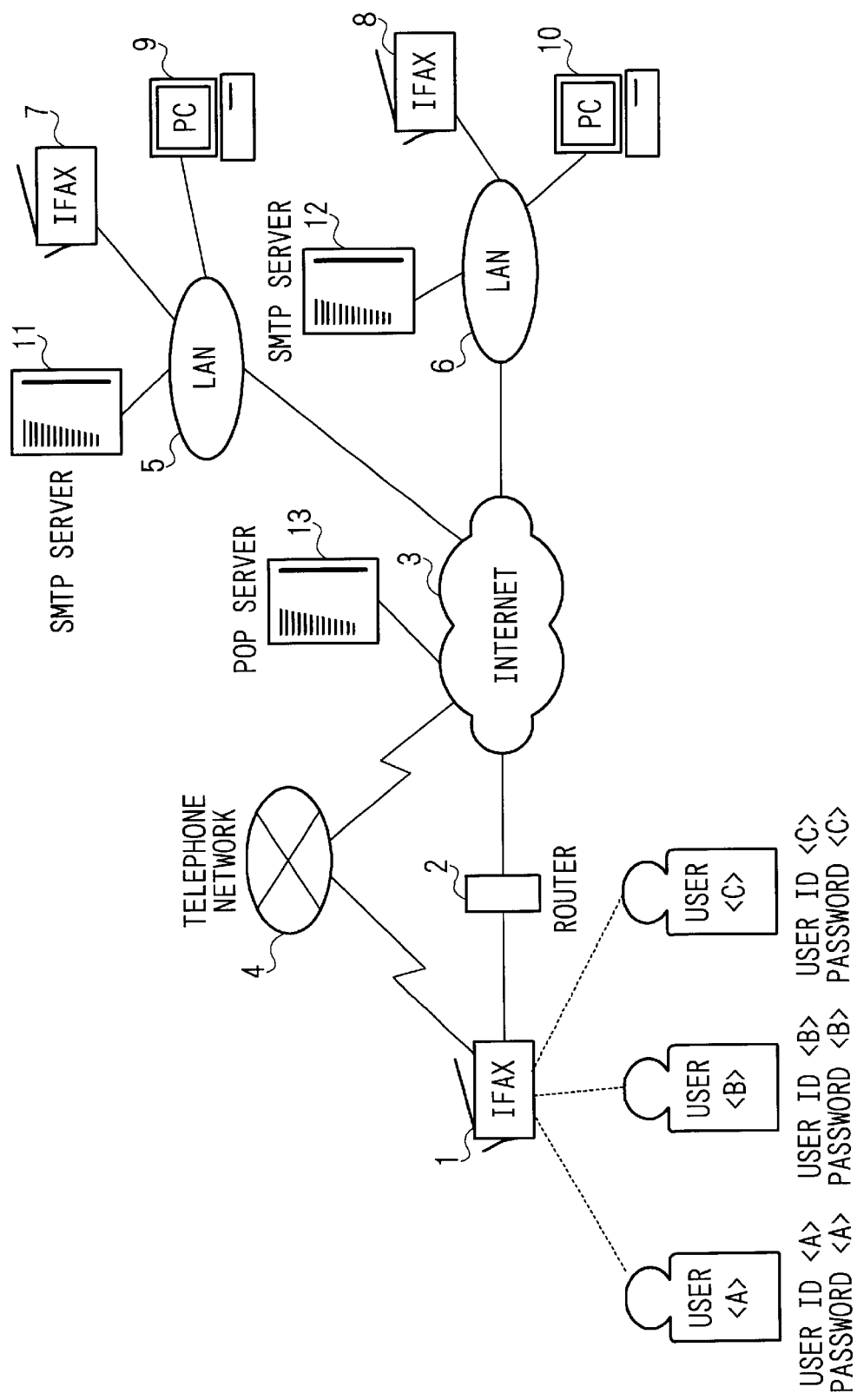
FIG. 1 is a conceptual view showing a network where an Internet facsimile terminal apparatus according to an embodiment of present invention operates.

FIG. 1 is a conceptual view showing a network where an Internet facsimile terminal apparatus of an embodiment of present invention operates.

An IFAX terminal apparatus 1 according to this embodiment is connected to Internet 3 via a router 2. Connecting means to Internet 3 is not limited to the router 2. Connecting means includes connection via a LAN, and a dial-up connection via a telephone network 4 using a modem or a terminal adapter.

A plurality of LANs 5 and 6 is connected to the Internet 3. The IFAX terminal apparatuses 7 and 8 provided on the transmitting side for transmitting e-mail to the IFAX terminal apparatus 1 and personal computers (PC) 9 and 10 are connected to the LANs 5 and 6. A mailer for transmitting/receiving e-mail is installed onto the PCs 9 and 10.

SMTP servers 11 and 12 are connected to LANs 5 and 6, respectively. SMTP servers 11 and 12 transfer an e-mail message, which is sent from a client such as IFAX terminal apparatuses 7 and 8 or PCs 9 and 10 and the like, to POP (Post Office Protocol) 3 server in accordance with SMTP (Simple Mail Transfer Protocol). SMTP is one of mail transfer protocols between the client and the server and between the servers.

A POP3 server 13, which IFAX terminal apparatus 1 uses, is provided on the Internet 3 or the like. The POP3 server 13 transfers e-mail between SMTP servers 11 and 13 in accordance with SMTP, and stores e-mail to a mailbox of each client. Then, the POP3 server 13 transfers e-mail to the client such as IFAX terminal apparatus 1. POP3 is one of protocols for transferring mail to the client from the server, and includes APOP, IMAP4, and so on.

In the above-configured system, the IFAX terminal apparatus 1 is shared by a plurality of users A, B, C. These users <A> to <C> have user IDs <A> to <C> and passwords <A> to <C>, which are assigned from the POP3 server 1, respectively. Then, the users <A> to <C> can receive e-mail from IFAX terminal apparatuses 7 and 8 and PCs 9 and 10 using the IFAX terminal apparatus 1.

In this system, the telephone network 4 includes, for example, a public switched telephone network (PSTN), an integrated services digital network (ISDN), a wireless telephone network, and the like.

The computer network that transmits and receives e-mail is constructed by the Internet 3, and LANs 5 and 6. The present invention is not limited to these networks, and wireless LAN, WAN, VAN and so on are widely included. Seeing from the different angle, any network, for example, TCP/IP network may be used if the computer network can implement the transmission and reception of image data according to an e-mail transfer protocol to be described later.

Figure 2:
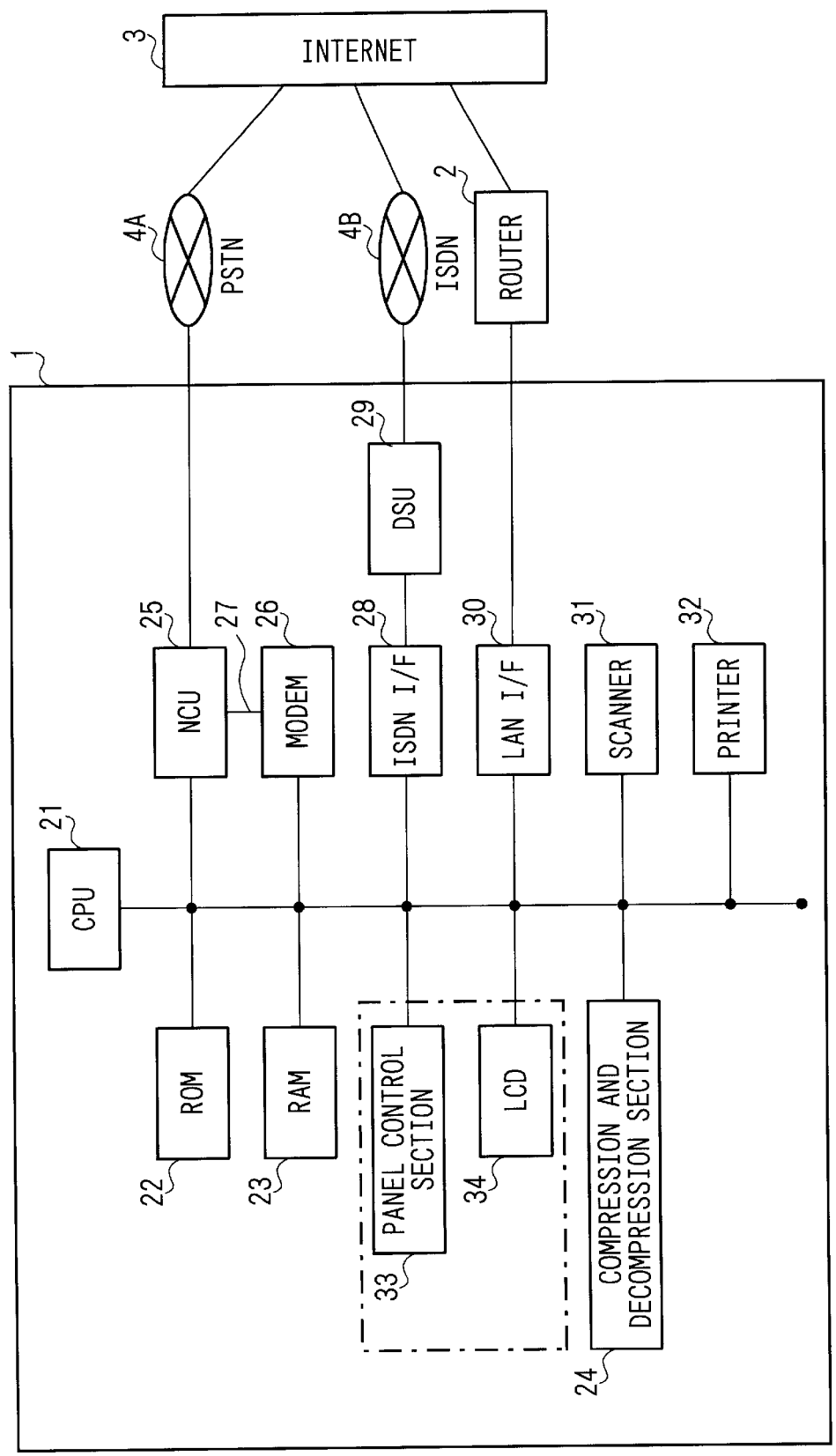
FIG. 2 is a block diagram showing hardware of the Internet facsimile terminal apparatus according to the above embodiment.

FIG. 2 is a block diagram showing hardware of the Internet facsimile terminal apparatus according to this embodiment. A CPU 21 executes a program and carries out control of the entirety of the apparatus. A ROM 22 stores a program that is executed by CPU 21.

A RAM 23 has a work area where the program is executed and a buffer area where various kinds of data such as e-mail, image file, and so on are temporarily stored.

A Compression/decompression section 24 compresses transmitting image data to facsimile data such as MH, MR, MMR, and the like, and decompresses received facsimile data to image data.

A Network control unit (NCU) 25 is connected to a PSTN 4a. A modem 26 is connected to the network control unit 25 by an analog signal line 27. The modem 26 modulates and demodulates facsimile data, which is transmitted/transmitted between the modem and the other facsimile apparatus, via the PSTN 4a. An ISDN interface (I/F) 28 is connected to an ISDN 46 via a digital service unit (DSU) 29.

A LAN interface 30 is connected to the Internet 3 via the router 2, and executes a procedure necessary for transmitting/receiving data via the Internet 3.

A scanner 31 scans an original and obtains image data. A printer 32 prints various kinds of data including the received image data.

A panel control section 33 receives operations done by an operator such as inputs of telephone number, e-mail address, user ID, password and an instruction of transmission starting. An LCD (liquid crystal display) 34 displays various kinds of information of facsimile and IFAX such as an input result, an operating status of the apparatus, a transmission result.

Figure 3:
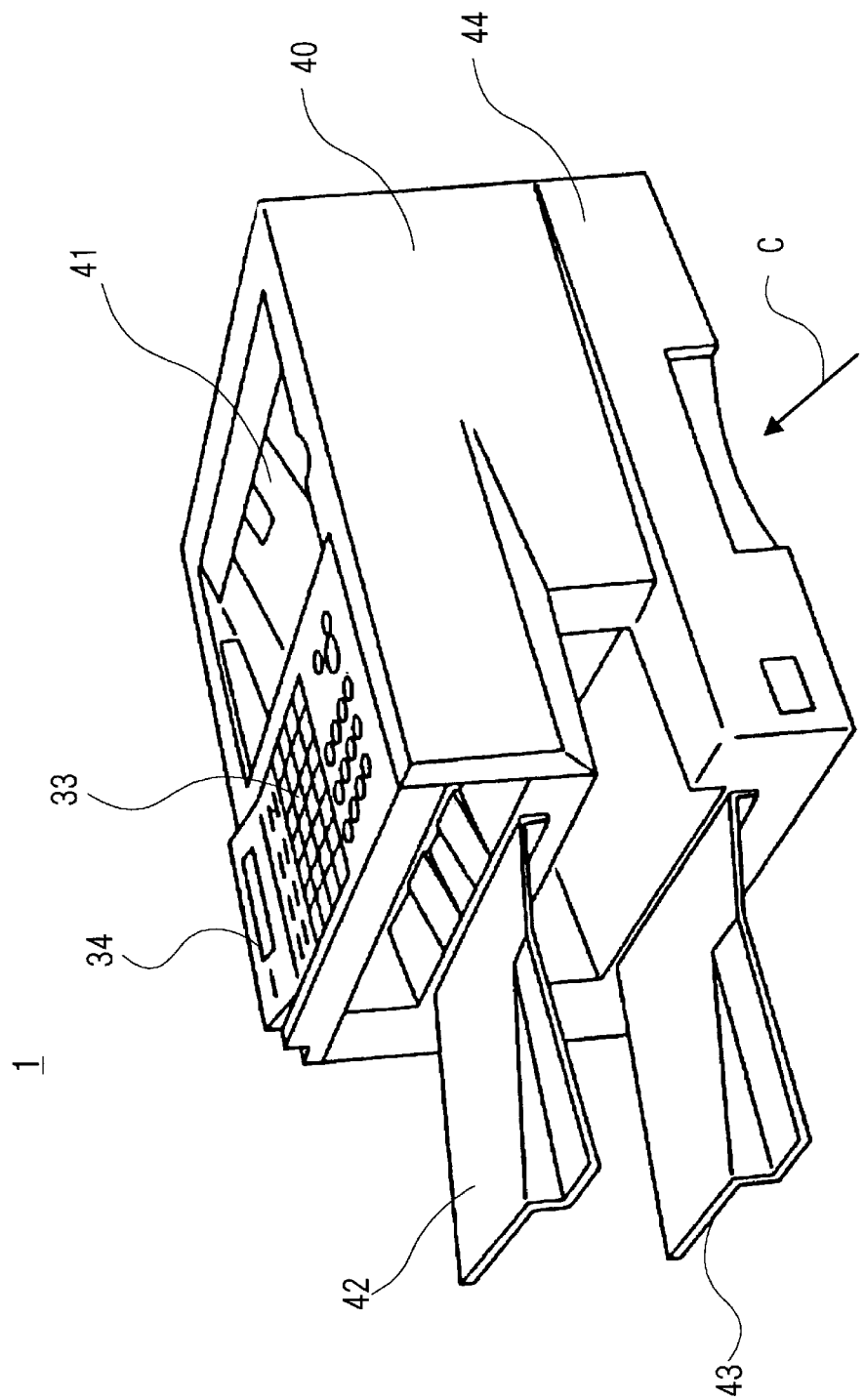
FIG. 3 is a perspective view showing an outline of the Internet facsimile terminal apparatus according to the above embodiment.

FIG. 3 is a perspective view showing an outline of the Internet facsimile terminal apparatus according to the above embodiment. The following will explain the IFAX terminal apparatus 1 seeing from the direction shown by an arrow C of FIG. 3. In the IFAX terminal apparatus 1, the scanner 31 and printer 32 are integrated into the housing 40 with other configuration elements, namely, CPU 21, ROM 22, RAM 23, compression/decompression section 24, NCU 25, modem 26, ISDN interface 28, LAN interface 30, panel control section 32, and LCD 34. The panel control section 33 and the LCD 34 are formed at an upper surface portion of the IFAX terminal apparatus 1, which is the left surface portion. An original supplying stage 41 for supplying an original to the scanner is provided at the right of the panel control section 33. At the left surface portion of the IFAX terminal apparatus 1, output trays 42 and 43 for receiving printing materials outputted from the printer 32 are provided in a vertical direction. A paper feeding section 44 for feeding paper to be printed to the printer 32 is provided at a bottom surface portion of IFAX 1.

Figure 4:
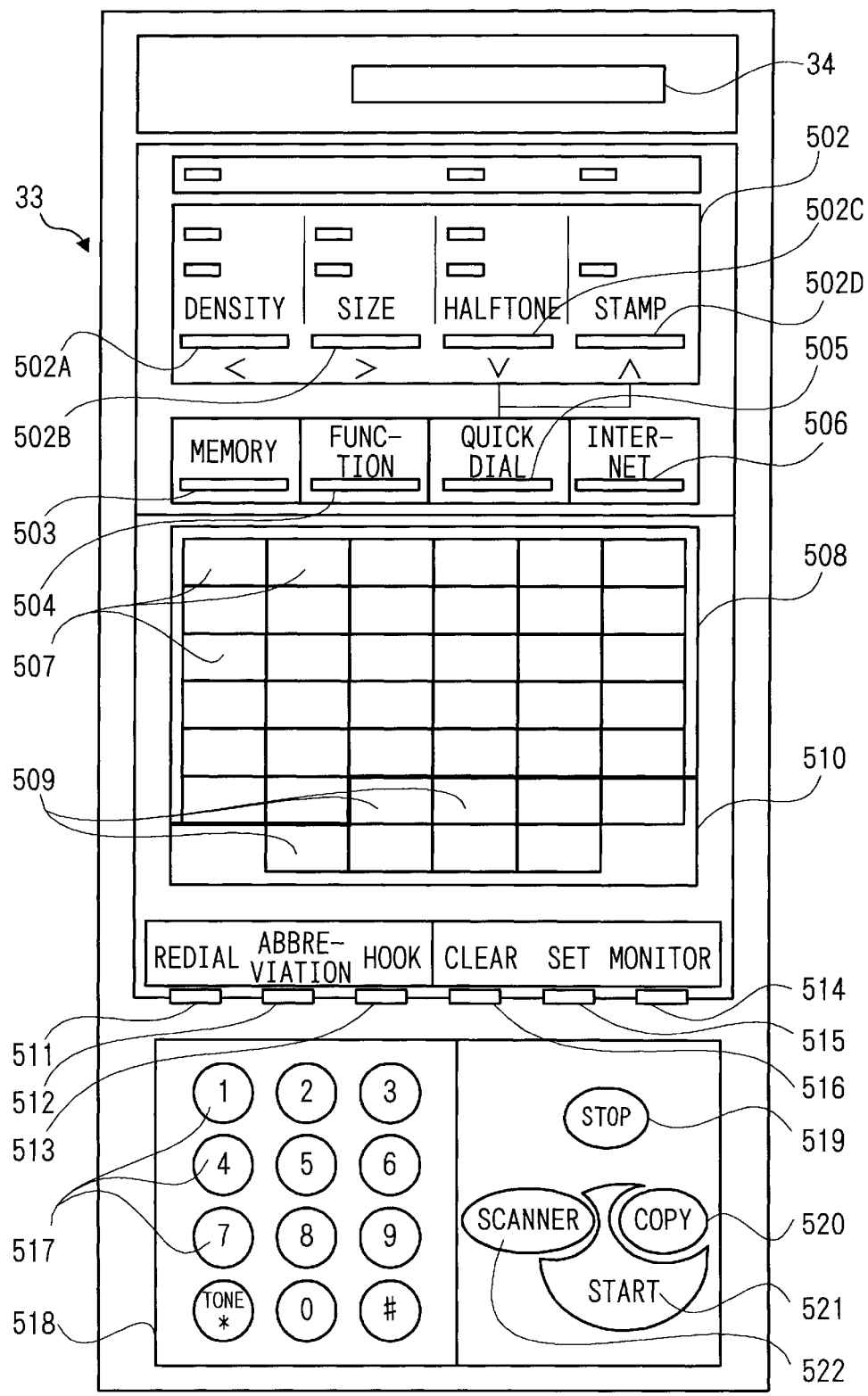
FIG. 4 is a plane view showing a panel control section and an LCD according to the above embodiment.

FIG. 4 is a plane view showing a panel control section and an LCD of the Internet facsimile terminal apparatus according to the above embodiment.

The LCD 34 is formed at the top portion of the panel control section 33. At the lower portion of the LCD 34, there is formed a print setting section 502 having a plurality of print setting buttons 502a to 502d for executing print setting such as print density, character size, halftone, and stamp for completion.

At the lower portion of the print setting section 502, a memory button 503, a function button 504, a quick dial button 505, and an Internet button 506 are arranged in order from the left. Among these buttons, the Internet button 506 is a button, which is used when the operator instructs a selection to input mode for Internet facsimile communication.

At the lower portion of these bottoms 503 to 506, there is provided a one-touch button section 508 having a plurality of one-touch buttons arranged. Moreover, at the lower portion of the one-touch button section 508, there is provided a program key input section 510 having a plurality of program keys 509 arranged.

At the lower portion of the program key input section 510, a redial/pause button 511, an abbreviated dialing button 512, a sub-address/hook button 513, a clear/monitor volume button 516, a set button 515, and a monitor button 514 are arranged in order from the left.

At the portion, which is the lower portion of these bottoms 512 to 516 and which is the left side than the center, a numeric keypad section 518 having a plurality of keys 517 is provided. At the right of the numeric keypad section 518, a stop button 519, a copy button 520, a start button 521, and a scanner button 522 are arranged.

The start button 521 is a button for instructing the start of FAX or e-mail transmission processing, and the scanner button 522 is a button, which is used when the operator instructs the execution of the network scanner operation. In addition, the start button 521 is handled as an instruction for a POP3 receiving operation when being pressed in a state that the LCD 34 is a standby screen page.

A ROM 22 shown in FIG. 2 stores a program, and the CPU 21 executes the program. The functions to be resultantly implemented will be explained as follows.

Figure 5:
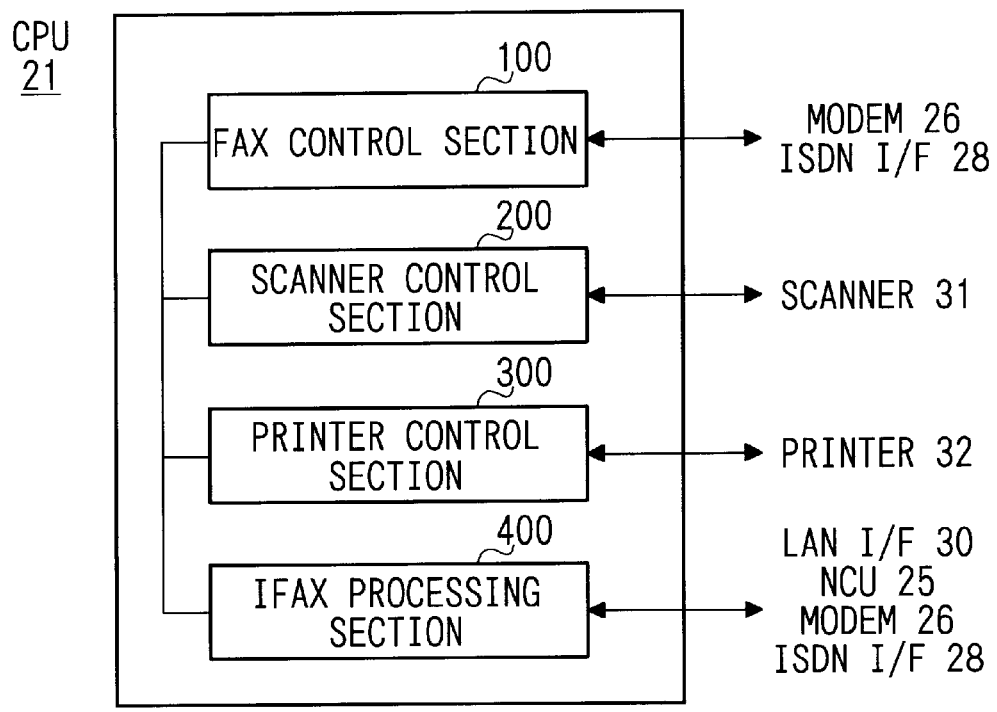
FIG. 5 is a block diagram showing functions of the Internet facsimile terminal apparatus according to the above embodiment.

FIG. 5 is a block diagram showing functions of the Internet facsimile terminal apparatus according to the above embodiment.

The IFAX terminal apparatus 1 comprises a FAX control section 100, a scanner control section 200, and a printer control section 300, which control the respective processing sections of the modem 26, ISDN interface 28, scanner 31, and printer 32.

The IFAX terminal apparatus 1 also comprises an IFAX processing section 400 that implements the function as IFAX. The IFAX processing section 400 is connected to the Internet 3 via the router 2 using the LAN interface 30, and transmits/receives e-mail. The IFAX processing section 400 is dial-up connected to the Internet 3 using the modem 26 or ISDN interface 28, and receives e-mail.

An explanation is given of an e-mail reception procedure in the IFAX terminal apparatus according to the above embodiment. Only a case using LAN interface 30 will be explained for the sake of convenience.

Figure 6:
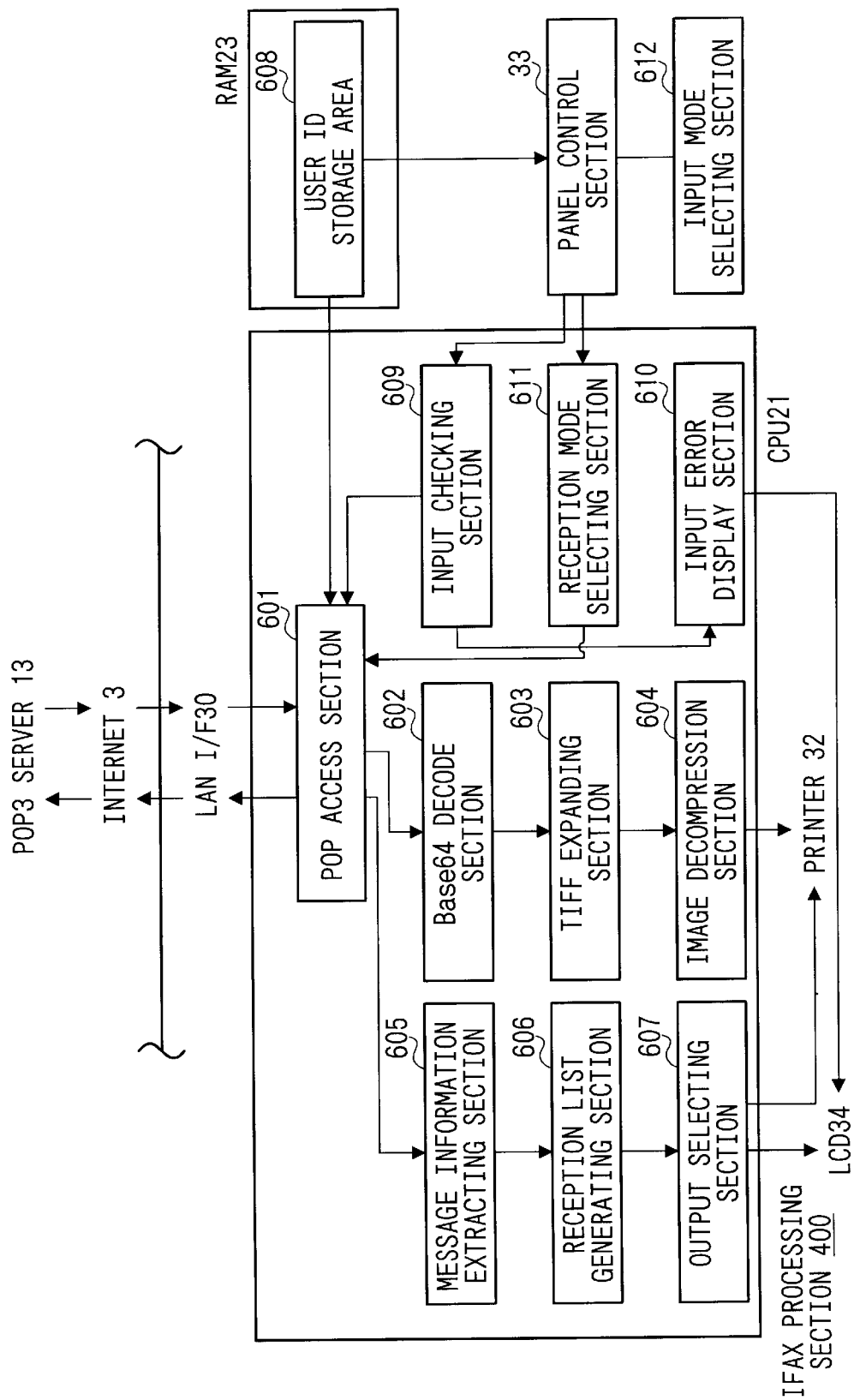
FIG. 6 is a block diagram showing e-mail receiving functions of the Internet facsimile terminal apparatus according to the above embodiment.

FIG. 6 is a block diagram showing e-mail receiving functions of the Internet facsimile terminal apparatus according to the above embodiment.

A POP access section 601 executes a POP3 protocol with the POP3 server 13. Namely, the POP access section 601 transmits a POP3 command defied by RFC 1394 and others to the POP3 server 13, and receives the response. By the transmission of a suitable command, the POP access section 601 executes connection to the POP3 server 13, user authentication exchange, acquisition of e-mail message information in the POP3 server 13, downloading of e-mail message, deletion of e-mail message, and the like.

A Base64 decoding section 602 decodes a text code of an attached file part of the received e-mail message according to the Base64 to obtain a TIFF-FX file. A TIFF expanding section 603 opens this TIFF-FAX file. An image decompression section 604 decompresses a compressed file included in the TIFF-FX file to obtain raw image data. By processing so far, e-mail is converted to a format for image data. Thus obtained image data is inputted to the printer 32 via the printer control section 300 and printed.

A message information extracting section 605 obtains e-mail message information such as the number of mails, sender of mail message, mail message sending time, capacity of mail message, and so on in accordance with the response from the POP server 13.

A reception list generating section 606 generates a reception list to be described later from the message information obtained by the message information extracting section 605. An output selecting section 607 selects an output destination of the reception list at the printer 32 and LCD 34.

A user ID registration table 700 is stored in a user ID storage area 608 of the RAM 23. As shown in FIG. 7, the user ID registration table 700 stores user IDs 701, passwords 702, and program key numbers 703 used to input these IDs and passwords to be associated with one another. The POP access section 601 accesses the POP3 server 13 using the IDs 701 and passwords 702 registered in the user ID registration table 700. Or, the inputs of user II) and password are carried out by use of the program keys 509 of the panel control section 33. In place of the program key numbers 703, the abbreviated numbers may be associated with the user IDs 701 and passwords 702.

An input checking section 609 checks whether or not the user ID and password inputted from the panel control section 33 are appropriate. If they are not appropriate, the input checking section 609 instructs an input error display section 610 to display the presence of an error input on the LCD 34.

A reception mode selecting section 611 selects the reception mode to an automatic reception mode or an automatic reception list generation mode (both are described later) in accordance with the instruction or the setting change from the operator, who uses the panel control section 33.

An input mode selecting section 612 selects the e-mail reception mode in accordance with the input from the panel operation section 33.

The following will explain the e-mail receiving operation of the IFAX terminal apparatus according to the above embodiment.

Figure 8:
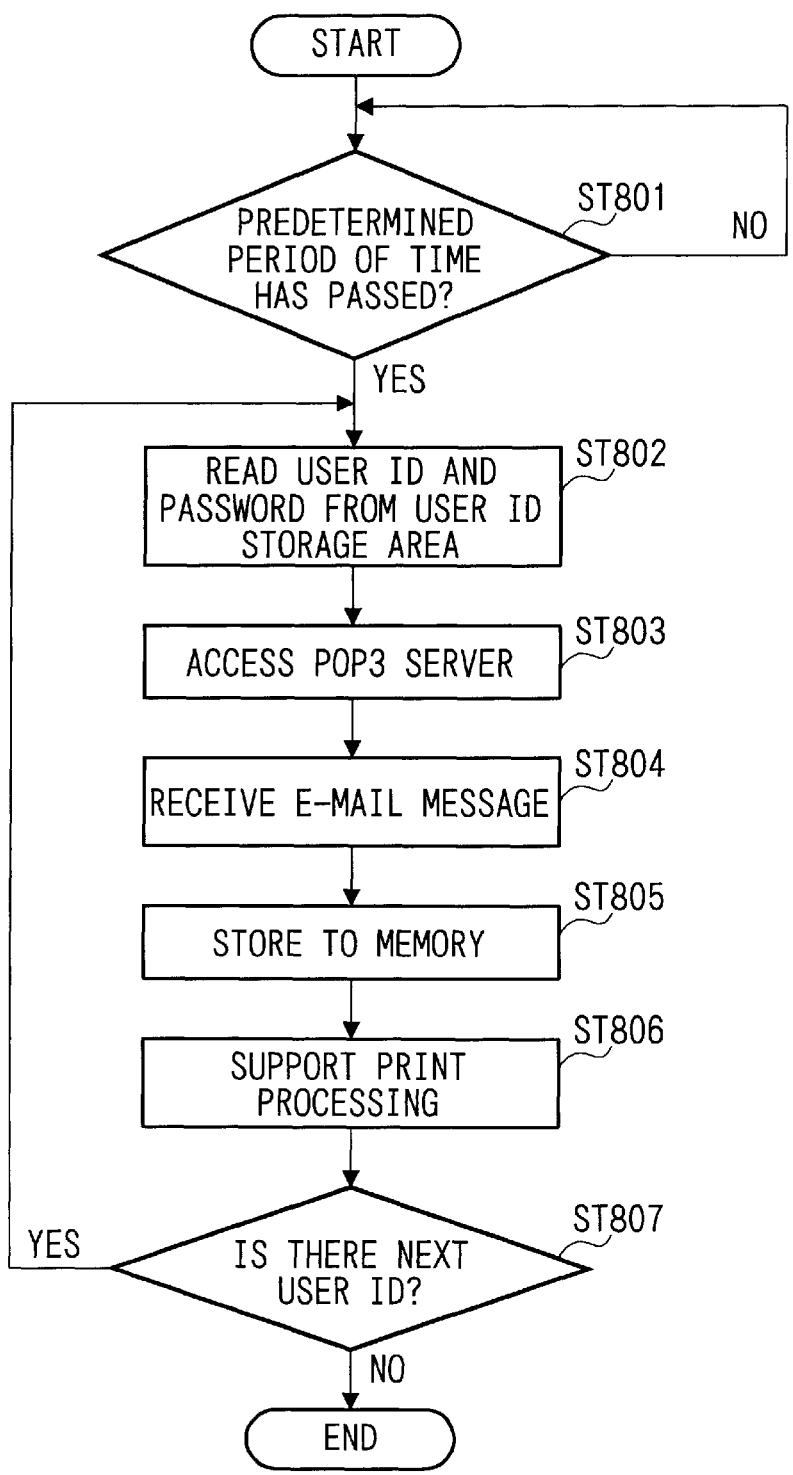
FIG. 8 is a flowchart showing an operation in an automatic reception mode of the Internet facsimile terminal apparatus according to the above embodiment.

First, an explanation is given of the automatic reception mode. FIG. 8 is a flowchart showing the operation in the automatic reception mode of the Internet facsimile terminal apparatus according to the above embodiment. In this mode, the POP access section 601 is connected to the POP3 server 13 and receives the e-mail message that has arrived at all users by use of all user IDs and passwords stored in the user ID storage area 608.

First, the POP access section 601 determines whether or not a predetermined time has passed since the start or the previous access (ST801). When the predetermined time has passed, the POP access section 601 reads out the first user ID 701 and the first password 702, which are registered in the user ID registration table 700 shown in FIG. 7 (ST802). The POP access section 601 accesses the POP3 server 13 using the read user ID 701 and password 702 (ST803). Then, the POP access section 601 receives the e-mail message from the mailbox of this user ID(ST804). Sequentially, the POP access section 601 stores the received e-mail message into a reception memory area (not shown) of RAM 23 (ST805).

Thereafter, the POP access section 601 instructs the Base64 decode section 602, TIFF expanding section 603, and image decompression section 604 to print the received e-mail message (ST806).

The Base64 decode section 602, which has received the above instruction, reads out an attached file part of the e-mail message from the reception memory. Then, the Base64 decode section 602 decodes the attached file part to obtain a TIFF-FX file in accordance with the Base64. Next, the TIFF expanding section 603 expands the TIFF-FX file to extract a compressed file. The image decompression section 604 decompresses this compressed file to obtain raw image data. This raw image data is printed by the printer 32.

On the other hand, the POP access section 601 determines whether or not there is a next user ID 701 in the user ID registration table 700 after the instruction of printing (ST807). When there is a next user ID 701, the processing goes back to ST802 and the processing in ST802 through ST806 is repeated, and the POP access section 601 receives the e-mail message directing to the corresponding user ID, and prints it. On the other hand, when there is no next user ID in ST807, processing is ended.

Figure 9:
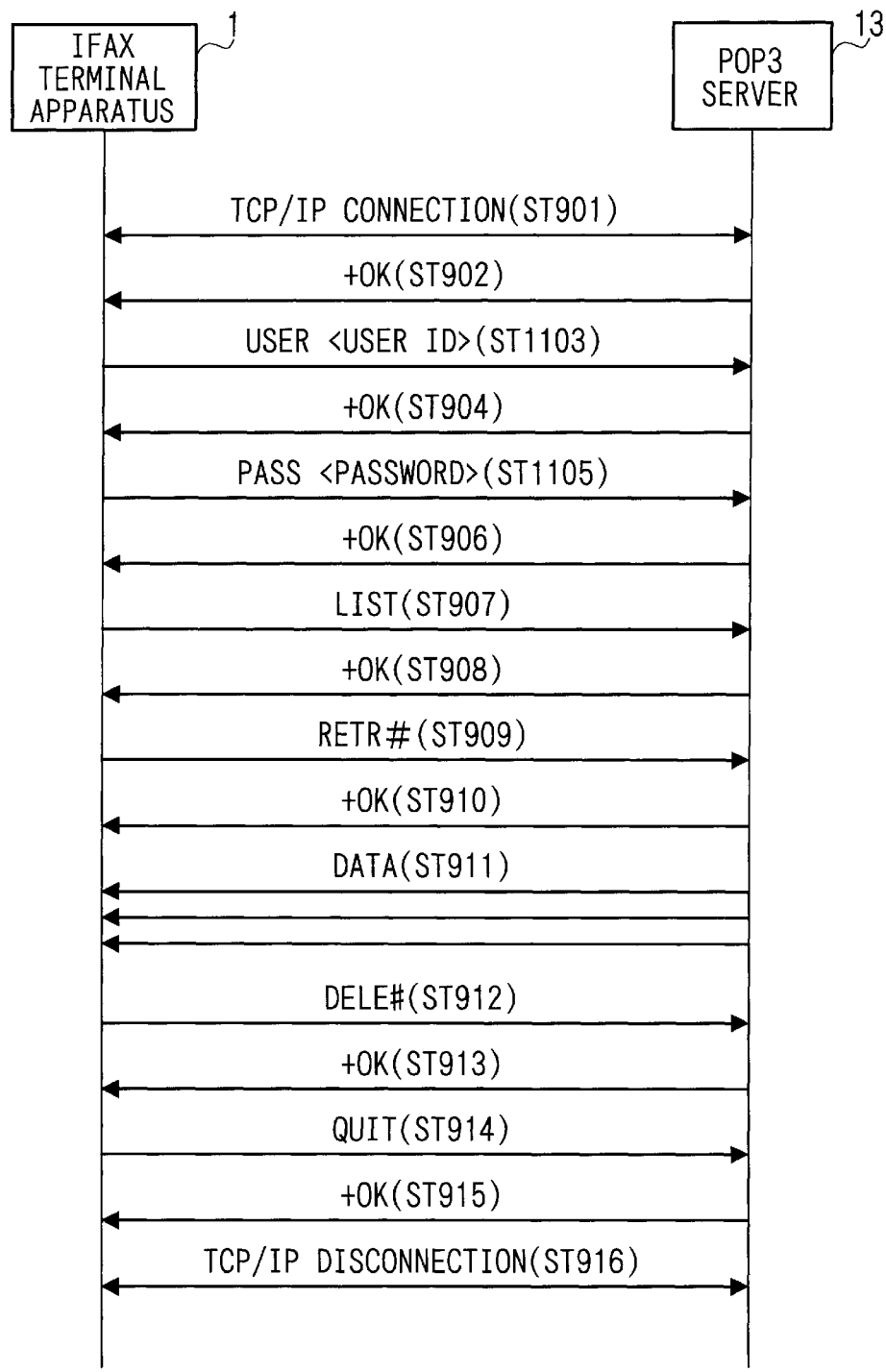
FIG. 9 is a sequence view showing an e-mail message receiving operation between the Internet facsimile terminal apparatus a POP 3 server in the automatic reception mode shown in FIG. 8.

FIG. 9 is a sequence view showing an e-mail message receiving operation between the Internet facsimile terminal apparatus and the POP3 server in the automatic reception mode shown in FIG. 8.

In the automatic reception mode, the IFAX terminal apparatus 1 executes the same procedure as that of the general POP3. Namely, the IFAX terminal apparatus 1 requests connection by TCP/IP of the POP3 server 13 (ST901). Next, when there is a +OK response from the POP3 server 13 (ST902), the IFAX terminal apparatus 1 adds the user ID 701 to a USR command as a parameter and transmits the USR command to the POP3 server 13 for the purpose of user authentication exchange (ST903). When there is a +OK response from the POP3 server 13 (ST904), the IFAX terminal apparatus 1 adds the password 702 to a PASS command as a parameter and transmits the PASS command thereto (ST905)

When there is a +OK response from the POP3 server 13 (ST906), the IFAX terminal apparatus 1 transmits an LIST command (ST907) and receives information of the number of mails received from the POP3 server 13 (ST908). Thereafter, when the IFAX terminal apparatus 1 makes a request for fetching #th e-mail by a RETR command (ST909), the POP3 server 13 returns the +OK response (ST910) and then transmits the #th e-mail message to the IFAX terminal apparatus 1 (ST911).

After fetching the e-mail normally, the IFAX terminal apparatus 1 requests the POP3 server 13 to delete #th e-mail message by a DELE command (ST912). The POP3 server 13 deletes the #th e-mail message from the mailbox in accordance with this request, and returns the +OK response (ST913). The IFAX terminal apparatus 1 repeats the procedure in ST903 through ST913 by the number of times corresponding to the number of e-mail arrived at the mailbox. After receiving all e-mail, the IFAX terminal apparatus 1 transmits a quit request (QUIT command) to the POP3 server 13 (ST914). Then, when there is a +OK response from the POP3 server 13 (ST915), the IFAX terminal apparatus 1 disconnects TCP/IP connection (ST916).

Thus, in the automatic reception mode, the IFAX terminal apparatus 1 automatically fetches e-mail from the POP3 server 13 in connection with all user IDs registered in the user ID registration table 700. E-mail is fetched at a predetermined time interval. The fetched e-mail is immediately printed by the printer 32. This automatic reception mode is extremely close to the conventional G3/G4 facsimile in the points that e-mail is received regardless of the operator's intention and image data attached thereto is printed.

Figure 10:
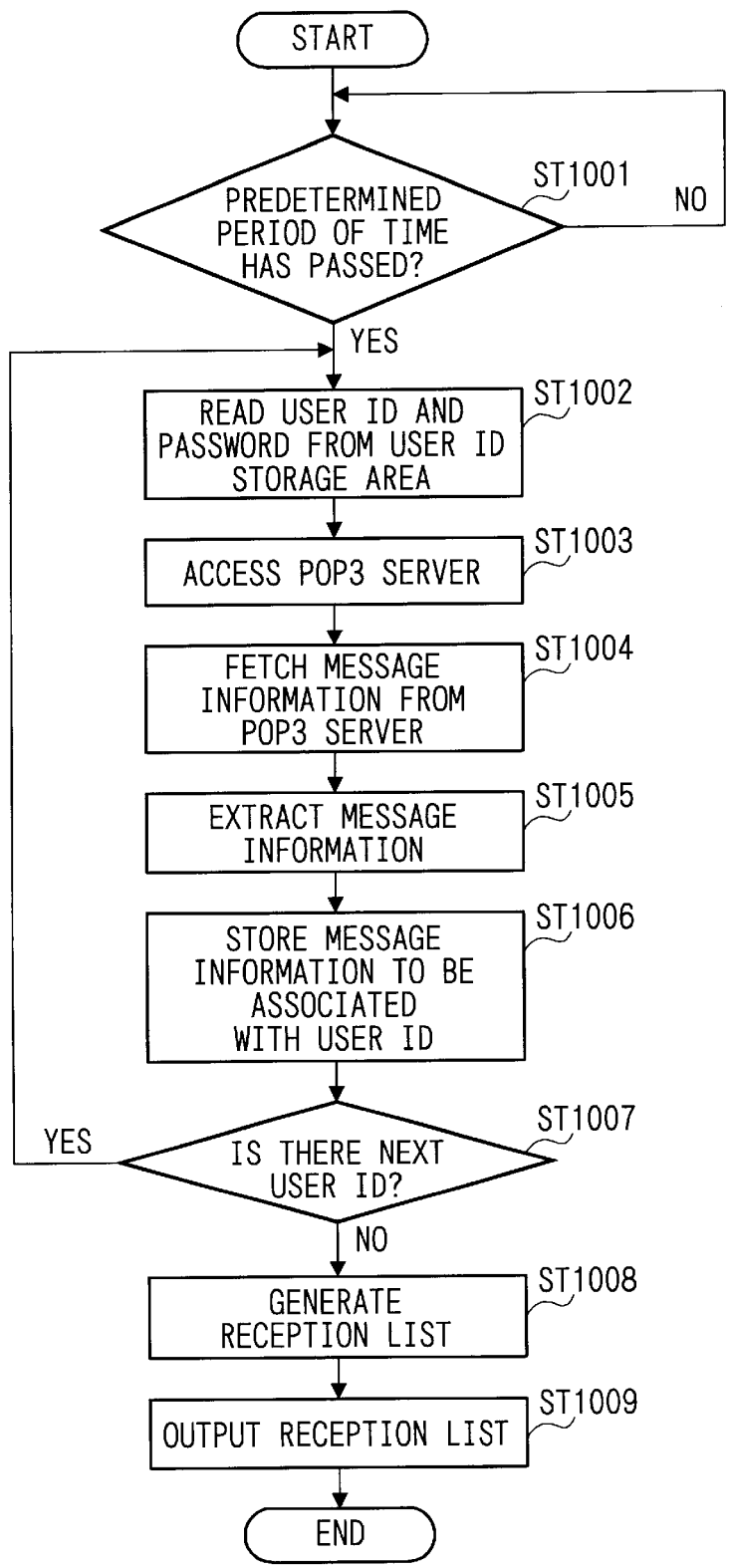
FIG. 10 a flowchart showing an operation of the Internet facsimile terminal apparatus in an automatic reception list generation mode according to the above embodiment.

An explanation of the automatic reception list generation mode will be next given. FIG. 10 is a flowchart showing the operation of the Internet facsimile terminal apparatus of the above embodiment in the automatic reception list generation mode. In this mode, the IFAX terminal apparatus 1 acquires image data contained in each mailbox of the POP3 server 13 using the user IDs and passwords stored in the user ID storage area 608, and generates a reception list and outputs it based on the acquired information.

First, the POP access section 601 determines whether or not a predetermined time has passed since the start or the previous access (ST1001). When the predetermined time has passed, the POP access section 601 reads out the first user ID 701 and the first password 702, which are registered in the user ID registration table 700 shown in FIG. 7 (ST1002). The POP access section 601 accesses the POP3 server 13 using the read user ID 701 and password 702 (ST1003). Then, the POP access section 601 fetches message information from the mailbox of this user ID, and stores it to a buffer area (not shown) of RAM23 (ST1004). The message information extracting section 605 extracts necessary information from the fetched message information (ST1005).

Herein, the message information includes, for example, the number of e-mail messages arrived at the mailbox, sender, subject, volume of data, a part of the message main body, destination information such as To and CC, sending date and time information and so on. In this example, the POP access section 601 fetches the number of e-mail messages from the POP3 server 13 by a LIST command, and the message information extracting section 605 extracts this number of e-mail messages.

The message information extracting section 605 stores extracted message information to a predetermined storage area (not shown) of RAM 23 to be associated with the user ID (ST1006).

An explanation of fetching message information from the POP3 server 13 will be given in detail.

Figure 11:
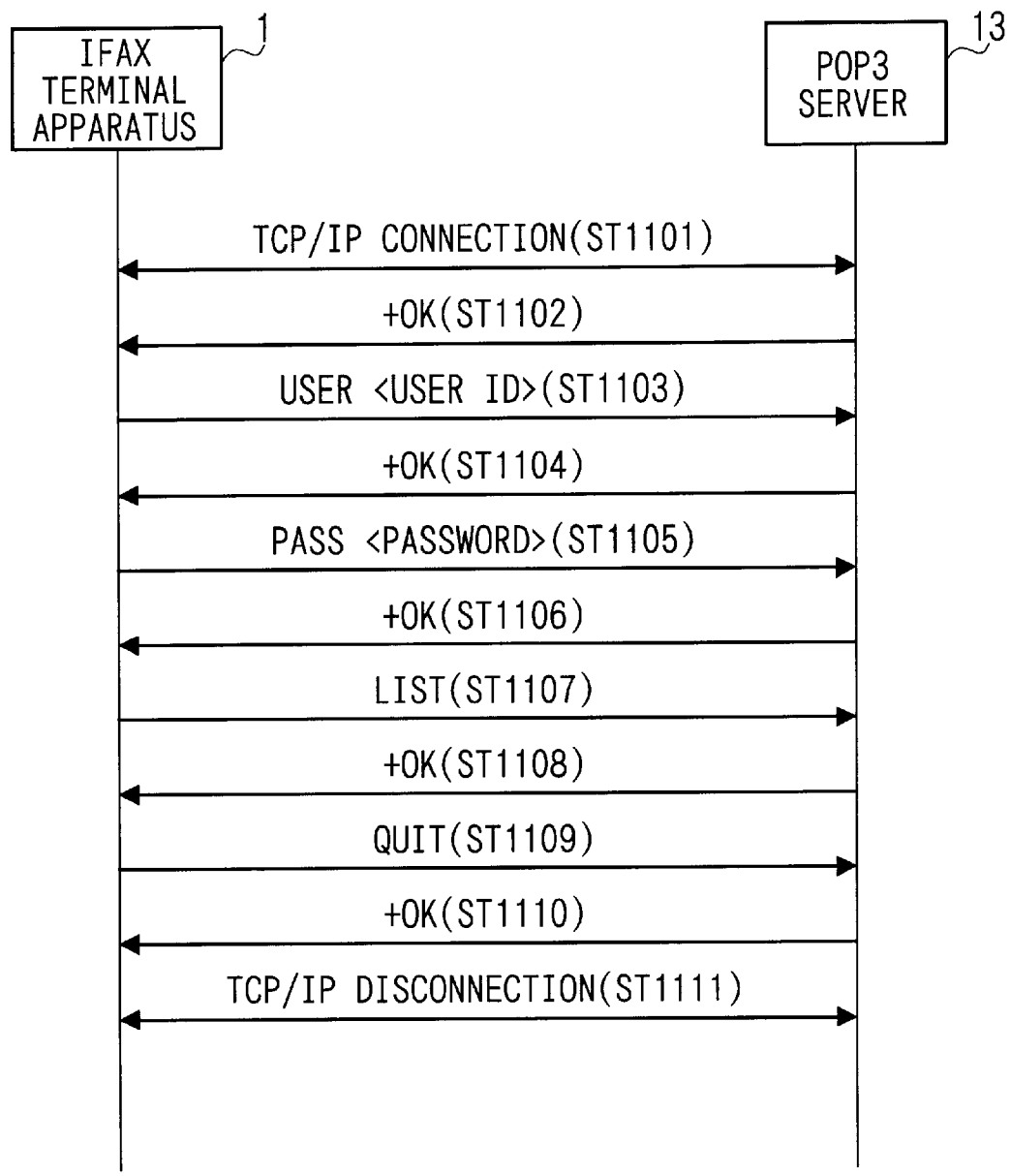
FIG. 11 is a sequence view showing an e-mail message receiving operation between the Internet facsimile terminal apparatus and the POP3 server in the automatic reception list generation mode shown in FIG. 10.

FIG. 11 is a sequence view showing an e-mail message receiving operation between the Internet facsimile terminal apparatus and the POP3 server in the automatic reception list generation mode shown in FIG. 10.

First, the IFAX terminal apparatus 1 executes the respective procedures of TCP/IP connection (ST 1101, ST 1102), user ID authentication (ST 1103, ST 1104) and password checking (ST 1105, ST 1106), similar to ST901 to ST906 of FIG. 9.

Next, the IFAX terminal apparatus 1 transmits the LIST command (ST1107), and receives the number of e-mail messages arrived at the mailbox of the corresponding ID from the POP3 server 13 (ST1108).

Though the IFAX terminal apparatus 1 fetches only the number of e-mail messages in this example, it is possible to fetch the other message information from the POP3 server 13. For example, the sender, sending date and time can be fetched by receiving header information of the e-mail message using a TOP command.

Thereafter, the IFAX terminal apparatus 1 transmits the quit request (QUIT command) to the POP3 server 13 (ST1109), and disconnects TCP/IP connection (ST1111) when there is a +OK response from the POP3 server 13 (ST1110).

After fetching and extracting such message information, the POP access section 601 determines whether or not there is a next user ID 701 in the user ID registration table 700 (ST1007). When there is a next user ID, the processing goes back to ST1102, and the processing in ST1002 through ST1006 is repeated. As a result, the POP access section 601 obtains message information from the mailbox of the corresponding user ID, and stores it.

On the other hand, when there is no next user ID in ST1007, the reception list generating section 606 reads out message information of all user IDs from the predetermined storage area of RAM 23, and generates a reception list (ST1008). Next, the reception list generating section 606 outputs the generated reception list (ST1009). At this time, the output selecting section 607 selects an output destination of the reception list at the printer 32 and LCD 34. This selection is carried out in accordance with the content set by the user or an ON/OFF operation of the dedicated button.

FIG. 12 is a view showing an example of the reception list of the Internet facsimile terminal apparatus according to the above embodiment. In a reception list 1201 shown in FIG. 12, the number of e-mail messages is displayed on a user-by-user basis.

The above example deals with only the number of e-mail messages as message information. As a matter of course, message information to be described in the reception list may be two or more. FIG. 13 is a view showing another example of the reception list of the Internet facsimile terminal apparatus according to the above embodiment. In this example, the number of e-mail messages, senders, sending date and time are listed in a reception list 1301 on a user-by-user basis. Though the reception list of all users is continuously printed in this example, the reception list may be printed on a separate sheet on a user-by-user basis.

Thus, in the automatic reception list generation mode, the IFAX terminal apparatus 1 automatically fetches message information from the POP3 server 13 in connection with all user IDs registered in the user ID registration table 700. E-mail is fetched at a predetermined time interval. The fetched message information is outputted by the printer 32 or LCD 34. According to this automatic reception list generation mode, only the number of e-mail messages and message information of, for example, sender are outputted. This makes it possible to inform the user of the reception of e-mail message without fear that the content of the e-mail message is known to other users.

Figure 14:
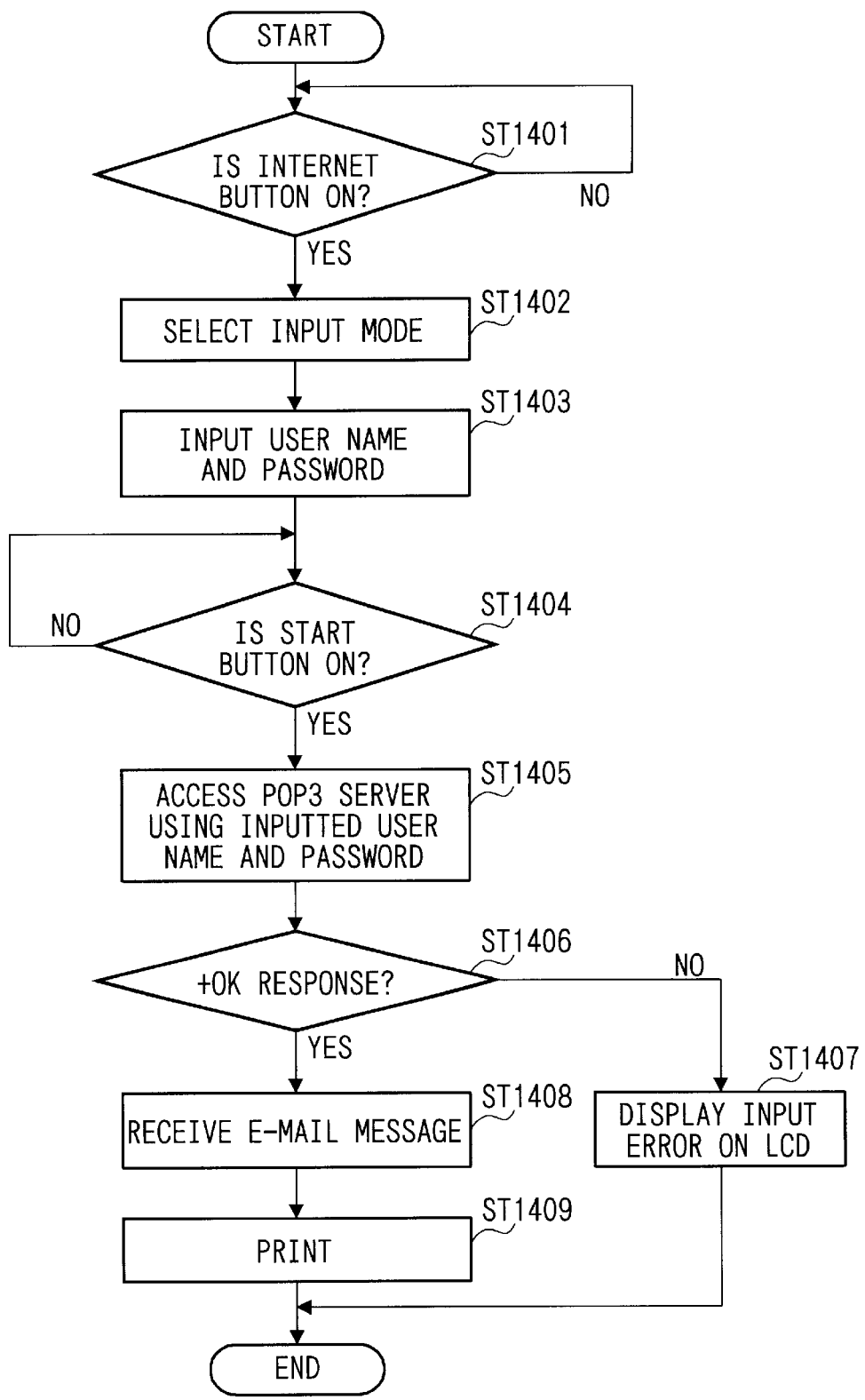
FIG. 14 is a flowchart showing an operation of the Internet facsimile terminal apparatus in a manual reception mode according to the above embodiment.

An explanation of a manual reception mode will be next given. FIG. 14 is a flowchart showing the operation of the Internet facsimile terminal apparatus according to the above embodiment in the manual reception mode. In the manual reception mode, the user accesses the POP3 server 13 using the user ID and password inputted from the panel control section 33, and receives the e-mail message.

First, the IFAX terminal apparatus 1 determines whether or not the Internet button 506 of the panel control section 33 is pressed on (ST1401). Regarding the mode of the input from the panel control section 33, the input mode selecting section 612 performs the selection from the input mode of the telephone number to the input mode of the user ID and password when the Internet button 506 is pressed on (ST1402).

Next, the IFAX terminal apparatus 1 receives the user ID and password, which are inputted by the user and which is sent from the panel control section 33 (ST1403). For example, alphabets and symbols relating to the user ID and password are inputted using the plurality of one-touch buttons 507 of the panel control section shown in FIG. 4. Also, numerals are inputted using the numeric keypad 517.

The inputs of user ID and password can be carried out at the touch of the program key 509. The program key number 703 is assigned to the user ID 701 and password 702 in the user ID registration table 700 as shown in FIG. 7. When the program key number 509 is pressed, the panel control section 33 reads the user ID 701 and password 702 corresponding to the program key number 703 with reference to the user ID registration table 700. Then, the panel control section 33 inputs the resultant to the CPU 21. Though the above has explained the input at the one-touch operation, this can be applied to the input of abbreviated number.

Next, the input checking section 609 determines whether or not the start button 521 is pressed (ST1404). When the start button 521 is pressed, the input checking section 609 accesses the POP3 server 13 using the inputted user ID and password (ST1405). When the inputted user ID and password are normal, a +OK response is returned thereto from the POP3 server 13. When the inputted user ID and password are not normal, an ERR response is returned thereto. To that end, the input checking section 609 checks whether or not the +OK response is returned (ST1406) to confirm whether or not the inputted user ID and password are appropriate. When not the +OK response but the ERR response is returned, the input error is displayed on the LCD 34 (ST1407). On the other hand, when the +OK response is returned, the IFAX terminal apparatus 1 receives the e-mail message from the mailbox of this user (ST1408) and prints it (ST1409).

As mentioned above, in the manual reception mode, the e-mail message is received from the mailbox of the corresponding user ID and printed using the user ID and password inputted from the panel control section 33. The reception of e-mail is immediately carried out on condition that the user ID and password are input and that the start button 521 is depressed. This makes it possible to receive the e-mail message at an arbitrary timing of the user's own intention and to print it.

In the IFAX terminal apparatus 1 according to the above embodiment, IFAX communication with high concealment is implemented by combining the automatic reception list generating mode and the manual reception mode. Namely, when no default concealment is required, the IFAX terminal apparatus 1 is set to the automatic reception mode. At this time, the IFAX terminal apparatus accesses the POP3 server 13 with respect to all user IDs, sequentially, receives the e-mail message, and prints it. In contrast, when the concealment is required, the user switches the reception mode of the IFAX terminal apparatus 1 to the automatic reception list generation mode. In this case, the IFAX terminal apparatus accesses the POP3 server 13 with respect to all user IDs, sequentially, and fetches only message information of the e-mail message. Then, the IFAX terminal apparatus generates the reception list, and outputs it. The user determines whether or not the e-mail message is needed as seeing this reception list. When the e-mail message is needed, the IFAX terminal apparatus 1 is used in the manual mode, whereby the IFAX terminal apparatus 1 receives the e-mail message arrived at the IFAX terminal apparatus 1, and prints it. In the automatic reception mode, there often occurs the problem wherein the e-mail message is received and printed without user's knowing, and is left on the output trays 43 and 43 of the IFAX terminal apparatus 1, with the result that the content of the e-mail message is known to other users. On the other hand, according to the automatic reception list generating mode and the manual reception mode, the e-mail message is received arbitrarily based on the user's own intention, and printed, and this prevents occurrence of such a problem and improves concealment.

Moreover, in the manual reception mode, the user ID and password are inputted from the panel control section 33 and the e-mail message is received and printed using these user ID and password. This makes it possible to prevent other users from receiving and printing the e-mail message without permission from the corresponding user. Even in the case of the one-push input and the input of the abbreviated number using the program key 509, only the user ID 701 is read from the user ID registration table 700 and the user inputs the password from the panel control section 33, thereby making it possible to implement the same concealment as that of the above-mentioned mode.

In the reception list, since message information is organized on the user-by-user basis as shown in FIGS. 12 and 13, the user can recognize message information easily. However, there is a case in which all message information is preferably organized in one list. For this reason, the reception list is desirably generated such that the operator can arbitrarily set the message information. Namely, it is desirably determined which reception list should be generated, the reception list in which message information is organized on the user-by-user basis as shown in FIGS. 12 and 13 or the reception list in which all message information is sorted in order of, for example, transmission date and time.

Furthermore, according to the above embodiment, the user instructs the IFAX terminal apparatus 1 to receive the e-mail message after confirming that the e-mail message is arrived at the user's destination as seeing the reception list. This makes it possible to prevent the IFAX terminal apparatus from being instructed to receive the e-mail message unless the e-mail message is arrived at the user's mailbox. Therefore, the unnecessary receiving operation of the e-mail can be prevented. This effect is brought to the fore when the IFAX terminal apparatus 1 is connected to the Internet 3 by the dial-up connection. This is because the communication cost of the telephone network 4 resulting from the unnecessary receiving operation of the e-mail can be reduced.

This invention may be conveniently implemented using a conventional general purpose digital computer or microprocessor programmed according to the teachings of the present specification, as will be apparent to those skilled in the computer art. Appropriate software coding can readily be prepared by skilled in programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMS, RAMS, EPROMS, EEPROMS, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

As explained above, according to the present invention, message information is acquired from the mail sever by use of the mail user IDs and passwords of the plurality of users sharing the Internet facsimile terminal apparatus, and the acquired message information is outputted. The e-mail message directing to the corresponding user is received from the mail server and printed in accordance with the user's instruction based on the outputted message information. Therefore, the e-mail message is arbitrarily received and printed in accordance with the user's intention based on the outputted message information. This prevents beforehand occurrence of the problem wherein the e-mail message is received and printed without user's knowing, and is left on the output trays of the IFAX terminal apparatus, with the result that the content of the e-mail message is known to other users. Then, this makes it possible to improve concealment.

The present invention is not limited to the above described embodiments, and various variations and modifications may be possible without departing from the scope of the present invention.

This application is based on the Japanese Patent Application No.2000-188366 filed on Jun. 22, 2000, entire content of which is expressly incorporated by reference herein.

What is claimed is:

1. An Internet facsimile terminal apparatus connectable to a server via an Internet, the Internet facsimile terminal apparatus comprising:
a mode setting device that selectively sets said Internet facsimile terminal apparatus to a reception list generation mode, in which said Internet facsimile terminal apparatus generates a reception list without receiving an e-mail stored on the server, said reception list containing message information regarding the stored e-mail;
a storage configured to store a user ID of a user; and
a controller configured to access the server using the user ID to extract message information of the e-mail associated with the user ID, the controller being further configured to generate the reception list on a user-by-user basis, based on the extracted message information when said reception list generation mode is set by said mode setting device.

2. The Internet facsimile terminal apparatus according to claim 1, wherein said message information includes at least one of a sender, a subject, volume of data, a portion of a main body of a message, destination information, a sending information, and a sending time.

3. The Internet facsimile terminal apparatus according to claim 1, further comprising a display that displays said generated reception list, said generated reception list being arranged to display said message information of all users on a same page.

4. The Internet facsimile terminal apparatus according to claim 1, further comprising a display that displays said generated reception list, said generated reception list being arranged to display said message information of each user on a separate page.

5. The Internet facsimile terminal apparatus according to claim 1, further comprising a printer that prints said generated reception list, said generated reception list being arranged to display said message information of all users on a same page.

6. The Internet facsimile terminal apparatus according to claim 1, further comprising a printer that prints said generated reception list, said generated reception list being arranged to display said message information of each user on a separate page.

7. A method for an Internet facsimile terminal apparatus to communicate with a server via an Internet, the method comprising:
storing a user ID of a user;
accessing a server using the stored user ID;
extracting message information from an e-mail stored on the server associated with the user ID; and
generating a reception list based on the extracted message information, without receiving the stored e-mail from the server associated with user ID, the reception list representing message information regarding the e-mail stored on the server on a user-by-user basis.

8. The method according to claim 7, wherein the message information includes at least one of a sender, a subject, volume of data, a portion of a main body of a message, destination information, a sending information, and a sending time.

9. The method according to claim 7, further comprising displaying the reception list, the reception list being arranged to display the message information of all users on a same page.

10. The method according to claim 7, further comprising displaying the reception list, the reception list being arranged to display said message information of each user on a separate page.

11. The method according to claim 7, further comprising printing the reception list, the reception list being arranged to display said message information of all users on a same page.

12. The method according to claim 7, further comprising printing the reception list, the reception list being arranged to display said message information of each user on a separate page.

13. A method for an Internet facsimile terminal apparatus to communicate with a server via an Internet, the method comprising:

storing at least one user ID associated with a password in a storage device;

accessing a server at predetermined time intervals to acquire image data contained in a mail box of the server that is associated with the stored at least one user ID and associated password; and producing a reception list for each of the at least one user ID.

14. The method according to claim 13, wherein accessing a server comprises:

examining message information from the server;

extracting necessary information from the examined message information; and storing message information to a predetermined storage area associated with each of the at least one user ID and associated password.

15. The method according to claim 14, further comprising producing the reception list after the message information is stored.

16. The method according to claim 13, wherein the image data represents e-mail received by the server.

17. The method according to claim 16, wherein accessing a server comprises:

examining the e-mail on the server;

extracting necessary information from the examined e-mail; and storing the e-mail to a predetermined storage area on the server associated with each of the at least one user ID and associated password.

18. The method according to claim 17, further comprising producing the reception list from the extracted necessary information without receiving the e-mail from the server.

19. The method according to claim 13, wherein the reception list is produced from the extracted necessary information.

* * * * *

UNITED STATES PATENT AND TRADEMARK OFFICE
CERTIFICATE OF CORRECTION

PATENT NO. : 6,785,018 B2
DATED : August 31, 2004
INVENTOR(S) : T. Wakabayashi

It is certified that error appears in the above-identified patent and that said Letters Patent is hereby corrected as shown below:

Title page,
Item [56], References Cited, OTHER PULBICATIONS, insert the following:
-- English Language Abstract and English Translation of JP Appln. No. 10-107837. --

Signed and Sealed this

Eighth Day of February, 2005

JON W. DUDAS
*Director of the United States Patent and Trademark Office*